United States Patent [19]
Hollins

[11] 3,821,998
[45] July 2, 1974

[54] PLATE FOR HINDERING THE THEFT OF A STORAGE BATTERY FROM A MOTOR VEHICLE

[76] Inventor: Jesse R. Hollins, 1 Chester Dr., Great Neck, N.Y. 11021

[22] Filed: May 31, 1972

[21] Appl. No.: 258,316

[52] U.S. Cl............. 180/68.5, 224/42.32, 248/359
[51] Int. Cl............................................ B60r 18/02
[58] Field of Search......... 180/68.5, 65; 248/361 R, 248/359, 360, 205 A, 154; 224/42.32, 42.33

[56] References Cited
UNITED STATES PATENTS

| | | | |
|---|---|---|---|
| 1,480,831 | 1/1938 | Galamb............................ | 180/68.5 |
| 2,104,457 | 1/1924 | Murphey....................... | 224/42.32 X |
| 2,306,833 | 12/1942 | Thannhauser..................... | 180/68.5 |
| 3,666,225 | 5/1972 | Weinberger..................... | 248/205 A |

FOREIGN PATENTS OR APPLICATIONS

| 1,192,717 | 5/1965 | Germany.......................... 180/68.5 |
|---|---|---|

Primary Examiner—David Schonberg
Assistant Examiner—Milton L. Smith

[57] ABSTRACT

A plate for hindering the theft of a storage battery from a motor vehicle. Means is provided for securing a storage battery housing to a vehicle mounting structure in such a manner that the storage battery cannot be detached from the mounting structure which extends from the vehicle frame unless the vehicle is lifted up a sufficient distance from the ground so that a person can fit under the vehicle and disassemble the securing means from the underside of the vehicle. The securing means is provided by a holding plate which is bonded to the underside of the battery housing. The holding plate includes bolts or studs which depend from the bottom thereof and pass through holes in a battery cradle so that screws may be appropriately screwed up onto the bolts or studs from the underside of the battery cradle and in this manner have the battery fastened to battery cradle, which cradle in turn is part of the structure of the motor vehicle.

5 Claims, 6 Drawing Figures

PATENTED JUL 2 1974　　　　　　　　　　　　　　　　3,821,998

PLATE FOR HINDERING THE THEFT OF A STORAGE BATTERY FROM A MOTOR VEHICLE

CROSS REFERENCE TO RELATED APPLICATIONS

This application is related to my copending U.S. Pat. Application Ser. No. 248,025, filed Apr. 27, 1972, for "Apparatus For Hindering The Theft Of A Storage Battery From A Motor Vehicle."

BACKGROUND OF THE INVENTION

1. Field of the Invention

This invention relates to an apparatus for preventing storage batteries from being easily unfastened and removed from a motor vehicle.

2. Description of the Prior Art

Most motor vehicles presently in use are not equipped with motor compartment hood locks or alarm systems. Thus, a storage battery, which is placed under the hood near the motor, can easily be stolen, since in most instances, the storage battery is placed in a receptacle using a bracket and a standard nut and bolt arrangement to hold the battery in place. Since this bracket and nut and bolt arrangement is easily accessible when the hood of the motor vehicle is lifted up, the bracket can easily be removed, and after the battery cables are disconnected from the terminals of the battery, the battery is ready to be removed from the receptacle.

In my previous copending patent application for "Apparatus For Preventing The Theft Of A Storage Battery From A Motor Vehicle," Ser. No. 248,025, filed Apr. 27, 1972, there was described various embodiments which show the battery housing to be secured to the mounting structure of the motor vehicle. In each of these embodiments some change was made in the structure of the battery housing, i.e., forming molded edges adjacent the underside thereof, molding studs within the bottom portion of the battery housing for receiving carriage bolts. Such changes in the design of the battery housing only apply to batteries which will be manufactured in the future. Therefore presently designed batteries and batteries presently in use will still be subject to easy removal or theft.

SUMMARY OF THE INVENTION

1. Purposes of the Invention

It is therefore an object of this invention to prevent the easy theft and removal of storage batteries from motor vehicles.

It is another object of this invention to provide a new technique of securing a storage battery to the mounting structure of a motor vehicle in a manner such that the securing means are not readily accessible.

It is a still further object of this invention to provide means for securing a storage battery to a mounting structure of a motor vehicle without modifying the design of storage batteries that are presently in use.

It is a further object of this invention to prevent the easy theft of presently designed batteries and storage batteries presently in use.

Other objects of the invention will in part be obvious and in part be pointed out hereinafter.

2. Brief Description of the Invention

According to a broad aspect of the invention there is provided means for hindering the theft of a storage battery from a motor vehicle. Means is provided for securing the bottom section of the battery housing to a mounting structure in such a manner that the storage battery cannot be detached from the mounting structure which is part of the structure of the vehicle frame unless the vehicle is lifted up a sufficient distance from the ground so that a person can fit under the vehicle and disassemble the securing means from the underside of the vehicle.

A rigid holding plate is bonded to the bottom surface of the battery housing using a suitable adhesive such as epoxy glue. The holding plate has bolts or studs fastened to and extending from the bottom of the holding plate. The battery together with the holding plate are placed on or into the vehicle mounting structure, so that the bolts or studs are aligned with and pass through the holes in the mounting structure. The battery is secured to the vehicle mounting structure by tightening the nuts onto the bolts or studs from the underside of the mounting structure.

BRIEF DESCRIPTION OF THE DRAWINGS

In the accompanying drawings, in which are shown various possible embodiments of my invention.

DESCRIPTION OF THE PREFERRED EMBODIMENTS

Figure 1:
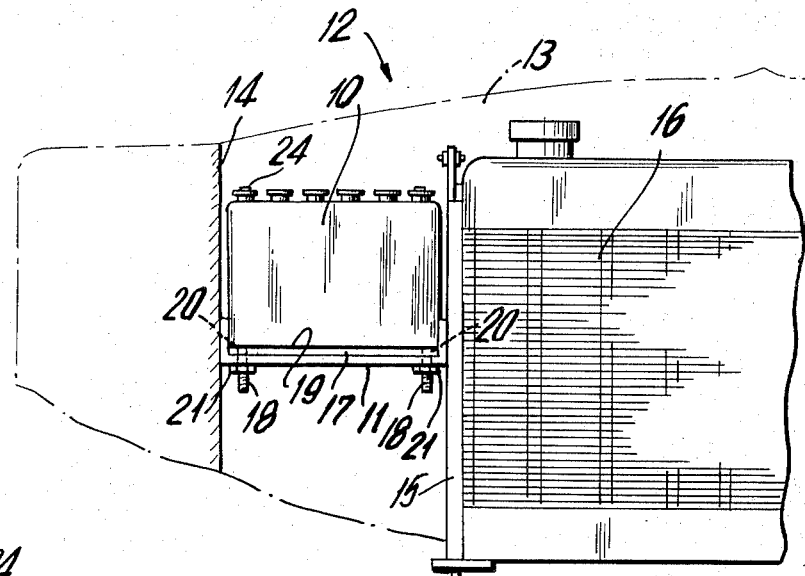
FIG. 1 is a partial cut away side view of the invention showing a battery housing placed within a motor compartment of a vehicle.

The invention will now be explained with reference to the various embodiments of the invention as shown in FIGS. 1 to 6.

In each of the embodiments of FIGS. 1 to 6, a storage battery housing 10, which is the external component and encases the elements of a storage battery, is secured to a battery mounting structure 11 in such a manner that the battery cannot be removed from a vehicle 12 by tampering with battery housing 10 within a motor compartment 13. Mounting structure 11 may be a battery cradle which the vehicle manufacturer has provided for the mounting of a battery which usually extends between a mudsplash guard 14 at the rear of a vehicle fender and a support bar 15 of a radiator 16. In these embodiments, the means for detachably securing the battery housing to and from the mounting structure is only accessible from the underside of the mounting structure so that, in effect, the vehicle actually has to be lifted off the ground so that the securing means are only accessible from the underside of the vehicle.

According to one embodiment of the invention, as shown in FIG. 1, a rigid holding plate 17 can have threaded studs 18 molded into, embedded within or welded or swedged to the bottom of holding plate 17 wherein the studs extend downward therefrom. The battery housing can be bonded to the holding plate by applying a satisfactory adhesive 19 to either the underside of the battery housing or the top surface of the holding plate. The adhesive may be any suitable epoxy adhesive or other satisfactory bonding means which will prevent the battery housing from being easily separated from the holding plate. Battery cradle 11 has holes therein which will align with the studs extending from the bottom of holding plate 17. Nuts 21 can then be screwed onto the end of each of studs 18 until the nuts are tight against the underside of the battery cradle. Since the underside of the battery cradle is accessible only from beneath the vehicle, and the vehicle frame is low slung, battery housing 10 can only be secured to and removed from the vehicle frame by, in effect, lifting the vehicle off the ground so that nuts 21 can be placed onto or removed from studs 18 from the underside of the vehicle.

Figure 2:
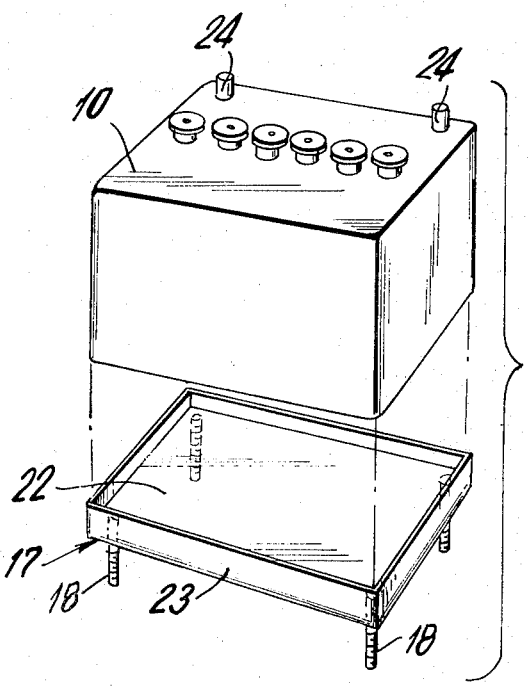
FIG. 2 is an exploded perspective view of the battery housing and one type of holding plate.

As shown in FIG. 2, the top surface 22 of holding plate 17 can have the same substantial area dimension as the underside of battery housing 10. Similarly the outer edges 23 of the holding plate can extend vertically upward from the top surface of the holding plate so as to surround the lower side portions of the battery housing and prevent the wedging of a sharp instrument between the battery housing and the holding plate, if, as is the case here, when the battery cradle is of the open structure type. While edges 23 may extend from all outer portions of the holding plate as shown in FIG. 2, edges 23 may extend from only selected parts of the top surface of holding plate 17. In FIGS. 1 and 2 terminal posts 24 are shown extending from the top of the battery housing, the drawing being exemplary.

Figure 3:
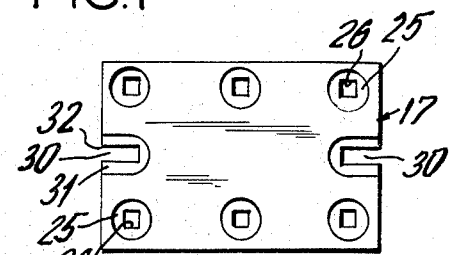
FIG. 3 shows a top view of another type of holding plate.
Figure 4:
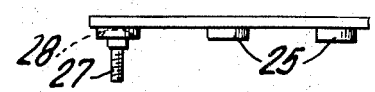
FIG. 4 shows a side view of the holding plate shown in FIG. 3.

FIGS. 3 and 4 show another embodiment of the holding plate shown in FIGS. 1 and 2. In this embodiment the holding plate can have a plurality of round extrusions 25, and square or other shaped holes 26 formed at the base of extrusions 25, so as to receive non-rotatable carriage bolts 27. Each of bolts 27 have an oval shaped head 28 which rests at the base of extrusion 25, and a square shaped portion 29 adjacent and beneath head 28 which passes through square shaped holes 26 so as to prevent the bolts from rotating within the holes. Any number of suitable bolts 27 can be placed within extrusions 25 and square holes 26.

The battery housing can be fixed to the battery cradle in one of two sequence of steps. In the first sequence, the holding plate is first fixed to the battery cradle as previously described. An adhesive resin such as epoxy or other suitable liquid, plyable semi-solid or solid material, is spread or placed over certain areas of top surface of the holding plate, such areas being randomly selected by the installer. The battery is then set on the freshly spread or placed adhesive until the adhesive has set (become tacky or hardened) sufficiently that the battery housing is fixed to the holding plate and the battery cradle.

In the second sequence of steps, the holding plate is bonded to the underside of the battery housing and the holding plate is then fastened to the battery cradle. If the second sequence of steps is followed, using the holding plate shown in FIGS. 3 and 4, and if the carriage bolts inadvertently are not placed within holes 26 before the holding plate is bonded to the underside of the battery housing, then the carriage bolts can be slid onto slotted portions 30 formed on opposite sides of the holding plate. Slotted portions 30 can have an embossed part 31 for holding the oval head of the carriage bolt, and an open part 32 for passing the square portion of the bolt therethrough. Holes can then be located and drilled in the battery cradle to align with the bolts held within the slotted portions of the holding plate, and the battery housing and holding plate can be fastened to the battery cradle as previously described.

Figure 5:
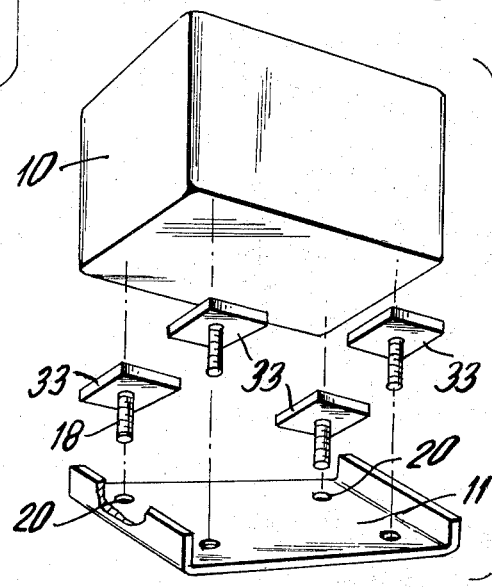
FIG. 5 is an exploded perspective view of another embodiment of the invention showing the use of several holding plates for fastening a battery housing to a mounting structure of a vehicle.

In the embodiments described above, the studs or bolts depending from the holding plate must be aligned with the holes in the battery cradle. If it is desired to avoid problems of aligning the bolts or studs depending from the holding plate with the holes in the battery cradle, then, as shown in FIG. 5, several small holding plates 33 having bolts or studs, depending therefrom in the same manner as described with reference to the embodiments of FIGS. 1 to 4, can first be fixed to cradle 11 as previously described above. Adhesive can then be applied to the top surface of the holding plates and the battery housing can be attached thereto. In this embodiment the location of the holes in the cradle are completely noncritical as long as the holding plates are fixed to the battery cradle prior to fixing the battery housing to the holding plates.

Figure 6:
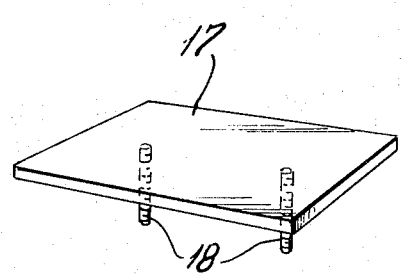
FIG. 6 is a perspective view of another embodiment of the holding plate shown in FIGS. 4 and 5 wherein the holding plate is rectangularly shaped and has two studs depending from a bottom surface thereof.

As shown in FIG. 6, holding plate 17 can be rectangularly shaped and can have two studs or bolts depending therefrom.

It should be noted that battery housing 10, holding plate 17 can be made of any suitable materials or combinations of materials such as metals and/or plastics which are adaptable to be firmly bonded together using commercially available cements and adhesives.

Although four hold down bolts and nuts are shown as exemplary of this installation, at least one or more bolts and nuts could be satisfactorily used in place thereof. Furthermore, various shaped holes and matingly shaped non-rotation type bolts may be used.

It thus is seen that there is provided a holding plate for hindering the theft of storage batteries from motor vehicles, which achieves the several objects of the invention and is well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described the invention, there is claimed as new and is desired to be secured by Letters Patent:

1. Apparatus for preventing the theft of a storage battery from a motor compartment of a motor vehicle, said motor compartment being supported by a vehicle frame, comprising a storage battery housing containing all elements of said battery, a mounting structure mechanically coupled to said vehicle frame, said mounting structure having a first upper surface for receiving said battery housing, said mounting structure having a second lower surface and having at least one hole extending from said first surface to said second surface, at least one holding plate having its top surface bonded to the underside of said battery housing, said holding plate including slotted portions extending from opposite ends thereof, each slotted portion having a recessed part and an open part, a carriage bolt placed within a slotted portion of said holding plate and extending through the open part thereof and through said mounting structure hole, means adjacent said mounting structure second surface for selectively securing said carriage bolt so as to fasten the holding plate and the battery housing to the mounting structure, whereby said securing means are only accessible from the underside of said motor vehicle, thus rendering it impossible to remove said battery from said compartment by detaching said battery housing from said mounting structure from within said compartment.

2. Apparatus for preventing the theft of a storage battery from a motor compartment of a motor vehicle, said motor compartment being supported by a vehicle frame, comprising a storage battery housing containing all elements of said battery, a mounting structure mechanically coupled to said frame, said mounting structure having a first upper surface for receiving said battery housing, said mounting structure having a second lower surface and at least one hole extending from said first surface to said second surface, at least one holding plate having its top surface bonded to the underside of said battery housing, said holding plate having at least one polygonally shaped hole extending through an extruded portion of said holding plate, at least one non-rotating bolt, said bolt being placed within the hole in said holding plate and extending through the hole in said mounting structure, and means adjacent said second surface of said mounting structure for selectively securing said bolt so as to fasten said holding plate and said battery housing to said mounting structure, whereby said securing means are only accessible from the underside of said vehicle, thus rendering it impossible to remove said battery from said compartment by detaching said battery housing from said mounting structure from within said compartment.

3. Apparatus according to claim 2 wherein said bolt contains an oval head, which abuts and extends over a top surface of said extruded portion, and a square portion directly beneath said head on said bolt, the hole in said holding plate having a square shape for receiving the square portion of said bolt so as to prevent said bolt from rotating.

4. A method of selectively securing a battery housing containing a battery to a mounting structure within a motor compartment of a motor vehicle comprising the steps of bonding a holding plate which has slotted portions on its opposite ends thereof for receiving carriage bolts to the underside of a battery housing, placing said holding plate with attached battery housing so that said holding plate is on a first surface of said mounting structure, said mounting structure having at least one hole therein and said holding plate having at least one stud mechanically coupled to the bottom thereof and passing said stud through said hole in said mounting structure, screwing at least one nut on to said stud until said nut is snug against the undersurface of said mounting structure so as to fasten said battery housing to said mounting structure, whereby said nut is only accessible from said underside of said mounting structure.

5. Apparatus for protecting against the theft of a storage battery from a motor compartment of a motor vehicle comprising a motor vehicle, said motor vehicle including a motor compartment and a motor vehicle frame, a motor vehicle storage battery housing containing all elements of said storage battery, a mounting structure mechanically coupled to said motor vehicle frame and including an upper surface and a lower surface, said mounting structure positioned so that access to said lower surface is obtainable only from the underside of the motor vehicle, said mounting structure having at least one hole extending from the upper surface to the lower surface, a holding plate having its top surface bonded to the underside of said battery housing, a non-rotatable threaded rod secured to said holding plate and extending through said mounting structure hole, and a nut adjacent the mounting structure lower surface in engagement with said threaded rod.

* * * * *